United States Patent
Hur et al.

(10) Patent No.: US 12,460,672 B2
(45) Date of Patent: Nov. 4, 2025

(54) SLIDE BLOCK ASSEMBLY HAVING BALL BUSHING BEARING

(71) Applicant: DAEWONSANUP CO., LTD., Ansan-si (KR)

(72) Inventors: Sun Ho Hur, Seoul (KR); Dong Kyu Lee, Ansan-si (KR); Tae Hyung Kim, Siheung-si (KR); Dong Hwi Kim, Ansan-si (KR)

(73) Assignee: DAEWONSANUP CO., LTD., Ansan-si (KR)

( * ) Notice: Subject to any disclaimer, the term of this patent is extended or adjusted under 35 U.S.C. 154(b) by 51 days.

(21) Appl. No.: 18/290,238

(22) PCT Filed: Jun. 22, 2022

(86) PCT No.: PCT/KR2022/008833
§ 371 (c)(1),
(2) Date: Nov. 10, 2023

(87) PCT Pub. No.: WO2023/282504
PCT Pub. Date: Jan. 12, 2023

(65) Prior Publication Data
US 2024/0352965 A1    Oct. 24, 2024

(30) Foreign Application Priority Data
Jul. 7, 2021    (KR) .................. 10-2021-0089281

(51) Int. Cl.
*F16C 29/04*    (2006.01)
(52) U.S. Cl.
CPC .................. *F16C 29/04* (2013.01)

(58) Field of Classification Search
CPC ...... F16C 29/001; F16C 29/002; F16C 29/04; F16C 2326/08; B60N 2/07; B60N 2/0735; B60N 2/0745; B60N 2/075
See application file for complete search history.

(56) References Cited

U.S. PATENT DOCUMENTS

| 4,809,939 A | | 3/1989 | Matsushima et al. |
| 6,113,275 A | * | 9/2000 | Blase ............... F16C 33/20 |
| | | | 384/42 |

(Continued)

FOREIGN PATENT DOCUMENTS

| DE | 202016101698 U1 * | 6/2016 |
| JP | 07-008055 U | 2/1995 |

(Continued)

OTHER PUBLICATIONS

Translation of DE202016101698 obtained Apr. 23, 2025.*

(Continued)

*Primary Examiner* — James Pilkington
(74) *Attorney, Agent, or Firm* — Bridgeway IP Law Group, PLLC; Sang Ho Lee; Hyun Woo Shin (57) ABSTRACT

The present disclosure relates to a slide block, the slide block assembly having a ball bushing bearing may include: a slide block which has formed at one side thereof a guide receiving part capable of receiving a slide guide of which at least a portion is formed as a linear section or a curved section; and a ball bushing bearing of which the inner surface is formed so as to correspond to the slide guide so as to be capable of making sliding contact with the slide guide, and the outer surface is formed so as to correspond to the guide receiving part so as to be capable of making rolling contact with the guide receiving part by means of a ball method.

9 Claims, 8 Drawing Sheets

(56) References Cited

U.S. PATENT DOCUMENTS 6,174,084 B1 * 1/2001 Pauwels .............. F16C 29/0645
384/57
2018/0354391 A1 12/2018 Guy et al.

FOREIGN PATENT DOCUMENTS

| JP | 2018-099997 A | 6/2018 |
| KR | 10-2010-0033583 A | 3/2010 |
| KR | 10-2010-0136741 A | 12/2010 |

OTHER PUBLICATIONS

Korean Intellectual Property Office, "Request for the Submission of an Opinion" issued for Korean priority Application No. 10-2021-0089281 on Oct. 14, 2022.
Korean Intellectual Property Office, "Written Decision of Registration" issued for Korean priority Application No. 10-2021-0089281 on Jan. 20, 2023.

* cited by examiner

SLIDE BLOCK ASSEMBLY HAVING BALL BUSHING BEARING

CROSS-REFERENCE TO RELATED APPLICATIONS

The present application is a U.S. National Stage Application under 35 U.S.C. 371 of PCT International Application No. PCT/KR2022/008833, filed on Jun. 22, 2022, and claims priority to Korean Application No. 10-2021-0089281, filed on Jul. 7, 2021, in the Korean Intellectual Property Office, the entire disclosures of which are incorporated herein by reference.

STATEMENT REGARDING SPONSORED RESEARCH OR DEVELOPMENT

The research and development of the present invention was conducted with the support of the Korea Institute of Advancement of Technology (KIAT) with the financial resources of the Ministry of Trade, Industry and Energy (MOTIE) from the World Class Plus Program (Project Number: P0021941, Detailed Project identifier: 1415189597).

TECHNICAL FIELD

The present invention relates to a slide block assembly having a ball bushing bearing, and more specifically, to a slide block assembly capable of preventing play and jamming from occurring between a slide guide and a seat cart traveling through a linear section or a curved section along the slide guide.

BACKGROUND ART

Generally, conventional long-slide devices are configured to include a linear bar-shaped lower rail that extends longitudinally in the forward and backward directions to enable the movement of a vehicle seat forward and backward, and a front-to-back movable bogie, with a seat frame fixed on one side, that can move forward and backward along the lower rail. The lower rail is entirely formed as a straight section, allowing the vehicle seat to move forward and backward in a straight line.

Such conventional linear long-slide devices cannot avoid rear wheel housings protruding into the interior space. Therefore, only the lower rail in the forward and backward directions are installed, or additional left-and-right direction rails, extending between the lower rail and the seat frame in the left and right directions, are installed to allow left and right movement of the vehicle seat during the forward and backward movement of the seat, thus avoiding the rear wheel housings.

However, these conventional long-slide devices with a linear lower rail and a linear left-right rail can only be operated manually by the user. The user cannot simultaneously perform linear manual operation and left-right manual operation. They are limited to sequential manual operations, such as left-right manual operation after forward-backward manual operation or forward-backward manual operation after left-right manual operation. This leads to significant inconvenience during use.

In addition, in the past, when applying left and right rails to the inside the seat, it required a certain amount of space in the height direction, which raised the seat's seating height and became a spatial hindrance to the application of other convenient functions of the seat.

On the other hand, recent trends in the widespread use of autonomous vehicles have led to the development of vehicle seats that can change their shape to be positioned at various locations within the interior space, all within the boundaries of existing safety regulations. However, in practice, there have been significant challenges in designing the technical configurations for lower rail, capable of moving along curved sections, and front-to-back movable bogies.

In particular, when driving through such curved sections and sections with changes in height, there were inevitable issues. The gap between the seat bogie, which travels along the slide guide on straight or curved sections, and the slide guide itself may either widen, resulting in a backlash phenomenon, or become too narrow, leading to jamming. These problems make smooth driving difficult.

DETAILED DESCRIPTION OF THE INVENTION

Technical Problem

The present invention aims to solve various problems including the problems described above. An object of the present invention is to provide a slide block assembly having a ball bushing bearing, which is capable of preventing play and a jamming situation from occurring between a slide guide and a seat cart traveling through a linear section or a curved section along the slide guide and not only enables smooth travel but also reduces vibration and noise by applying a ball bushing bearing made of elastic plastic material, as well as can firmly support the seat, occupants, and external forces, while significantly improving component assembly, tolerance management, and product durability. However, the above object is illustrative only, and does not limit the scope of the present invention.

Technical Solution

A slide block assembly having a ball bushing bearing according to an aspect of the present invention to solve the above problems may include: a slide block which has formed at one side thereof a guide receiving part capable of receiving a slide guide of which at least a portion is formed as a linear section or a curved section; and a ball bushing bearing of which the inner surface is formed so as to correspond to the slide guide so as to be capable of making sliding contact with the slide guide, and the outer surface is formed so as to correspond to the guide receiving part so as to be capable of making rolling contact with the guide receiving part by means of a ball method.

Also, according to the present invention, the ball bushing bearing may include a bearing body part formed overall in a ball shape; a through-hole part formed in the front and rear directions of the bearing body part to allow the slide guide to pass through its center; and a ball opening part on one side in the shape of "C" to forcibly engage with the slide guide to enhance assembly with the slide guide.

In addition, according to the present invention, the slide guide may be generally in the shape of a rectangular bar to prevent vertical and lateral play more robustly by increasing contact areas in the vertical and lateral directions and the through-hole part of the ball bushing bearing may have a rectangular hole shape to correspond to the slide guide.

In addition, according to the present invention, the bearing body part may be made of an elastic plastic material to allow the ball opening part to be forcibly expanded and engaged with the slide guide while reducing vibrations and noise.

In addition, according to the present invention, the guide receiving part of the slide block may have a spherical groove part formed on one side thereof to correspond to a spherical surface of the ball bushing bearing, and may have a block opening part on the other side thereof, in the shape of "C", to allow for a forced engagement with the ball bushing bearing in order to enhance assembly with the ball bushing bearing.

In addition, according to the present invention, the spherical groove part of the guide receiving part of the slide block may include a first spherical groove part formed on a first wall formed in front of the guide receiving part to reduce friction with the ball bushing bearing; and a second spherical groove part spaced apart from the first spherical groove part and formed on a second wall formed at the rear of the guide receiving part.

In addition, according to the present invention, the slide block may include a first slide block having a vertical through-hole formed on one side thereof, a first ball bushing bearing and a second ball bushing bearing installed on the other side thereof, and a sliding rail part formed on one lateral surface thereof; and a second slide block having a third ball bushing bearing and a fourth ball bushing bearing installed on one side thereof and configured to be fitted with the sliding rail part of the first slide block.

Additionally, according to the present invention, the slide block assembly may include a rotating body that passes through the vertical through-hole of the first slide block; and a pinion gear that has a pinion drive shaft rotatably installed inside the rotating body and engages with a rack gear installed on a rail of a vehicle, driving a seat cart of the vehicle during rotation.

Moreover, according to the present invention, at least four of slide block assemblies may be installed on the front left, front right, rear left, and rear right sides of a seat cart of a vehicle to support the vehicle's seat, an occupant, and external forces even in the curved section of the slide guide.

Furthermore, according to the present invention, the slide guide may be subjected to a soft anodizing surface treatment.

Advantageous Effects

According to some embodiments of the present invention as described above, it is possible to prevent play and a jamming situation from occurring between a slide guide and a seat cart traveling through a linear section or a curved section along the slide guide. It is also possible to not only enable smooth travel but also reduce vibration and noise by employing a ball bushing bearing made of an elastic plastic material, as well as to provide robust support for the seat, an occupant, and external forces while significantly improving component assembly, tolerance management, and product durability. However, the above effects do not limit the scope of the present invention.

MODE FOR INVENTION

The present invention will now be described in detail in connection with preferred exemplary embodiments with reference to the accompanying drawings.

The invention may, however, be embodied in different forms and should not be construed as limited to the embodiments set forth herein. Rather, these embodiments are provided so that this disclosure will be thorough and complete, and will fully convey the scope of the invention to those skilled in the art. Moreover, in the drawing figures, the thickness or dimensions of layers may be exaggerated for clarity of illustration and convenience.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to drawings that are schematic illustrations of idealized embodiments of the invention. As such, variations from the shapes of the drawings as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Hereinafter, a slide block assembly 100 having a ball bushing bearing according to various embodiments of the present invention will be described in detail with reference to the drawings.

Figure 1:
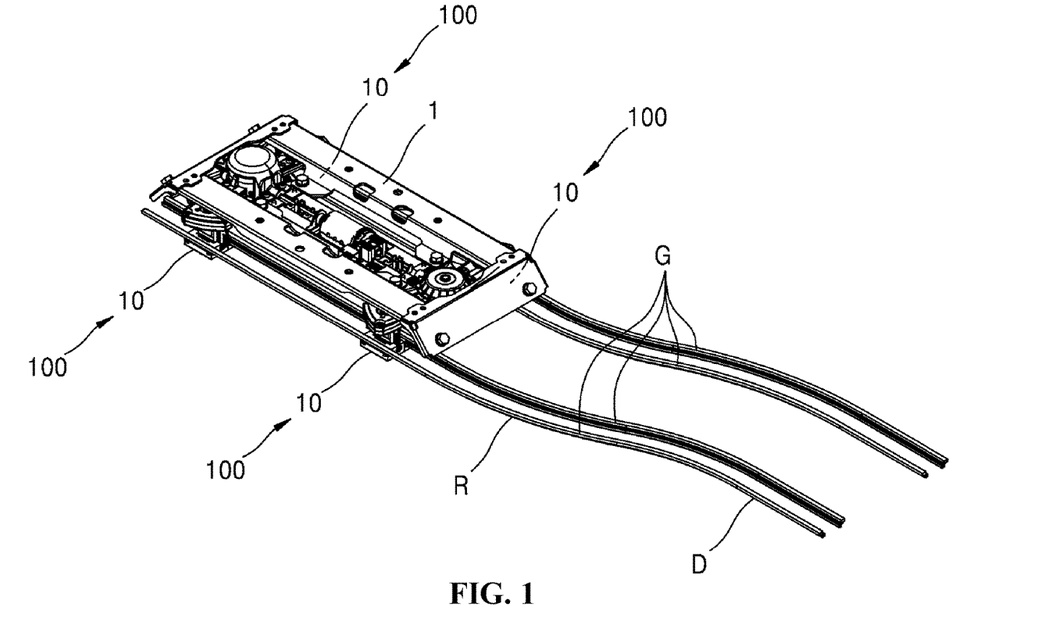
FIG. 1 is a perspective view showing a state in which a slide block assembly having a ball bushing bearing according to some embodiments of the present invention is installed on a seat cart.
Figure 2:
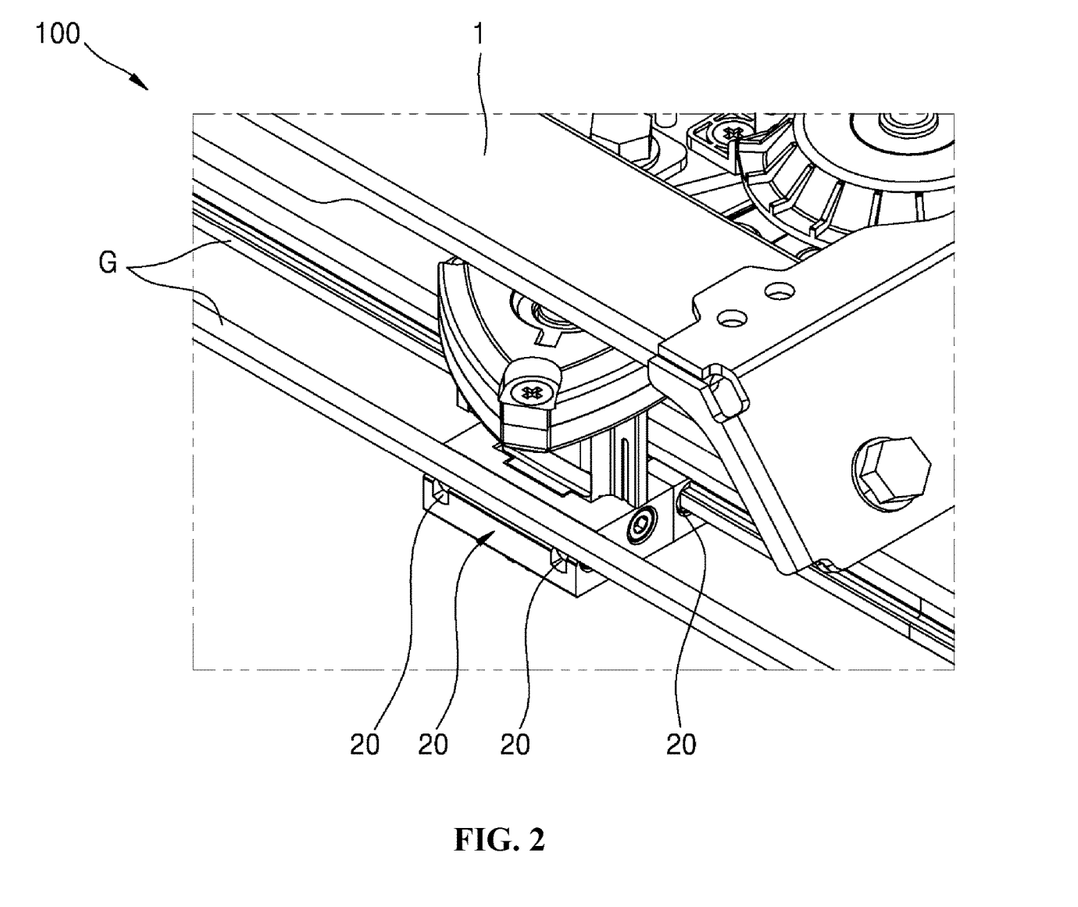
FIG. 2 is an enlarged perspective view of the slide block assembly having a ball bushing bearing of FIG. 1.

FIG. 1 is a perspective view showing a state in which a slide block assembly 100 having a ball bushing bearing 20 according to some embodiments of the present invention is installed on a seat cart, and FIG. 2 is an enlarged perspective view of the slide block assembly 100 having the ball bushing bearing 20 of FIG. 1.

First, as shown in FIGS. 1 and 2, the slide block assembly 100 having the ball bushing type bearing 20 according to some embodiments of the present invention is installed on a seat cart 1 that supports the seat of a vehicle, and may mainly include a slide block 10 and the ball bushing bearing 20.

At least four of slide block assemblies 100 having the ball bushing bearing 20 according to some embodiments of the present invention may be installed on the front left, front right, rear left, and rear right sides of the seat cart 1 of the vehicle to support the vehicle's seat, an occupant, and external forces even in the curved section R of a slide guide G.

In addition, for example, the slide guide G may include a total of four guides, two of which may be installed on the left side of the seat cart 1, spaced apart from each other, and the other two of which may be installed on the right side of the seat cart 1, also spaced apart from each other, to more securely support the vehicle's seat, the occupant, and external forces.

However, the number of installations of the slide guides G installed on one seat cart 1 is not limited to a total of four, and it may be installed in a wide range of quantities, including one, two, three, or five or more.

Furthermore, these slide guides G are not limited to forming only curved sections R and may also form linear sections D, and are not limited to the drawings. For example, the slide guides G be fixedly installed on one side inside the lower rail formed on the interior floor of the vehicle by welding.

Figure 3:
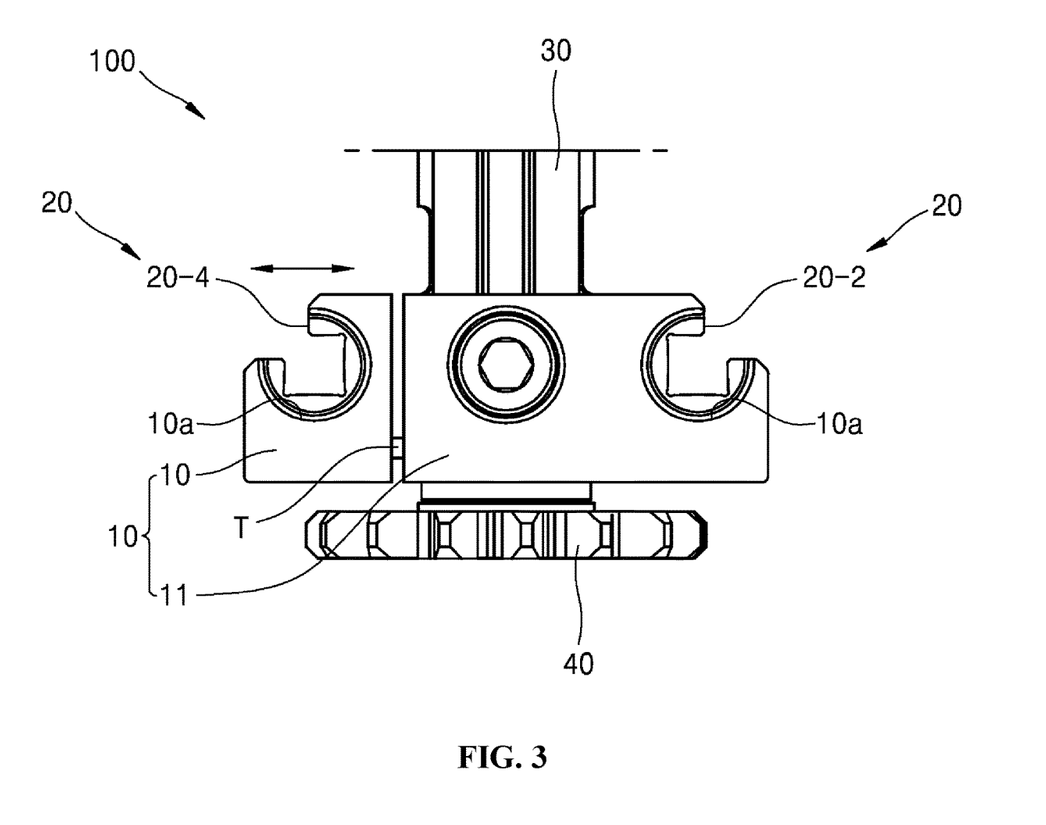
FIG. 3 is a front view of the slide block assembly having a ball bushing bearing of FIG. 1.
Figure 4:
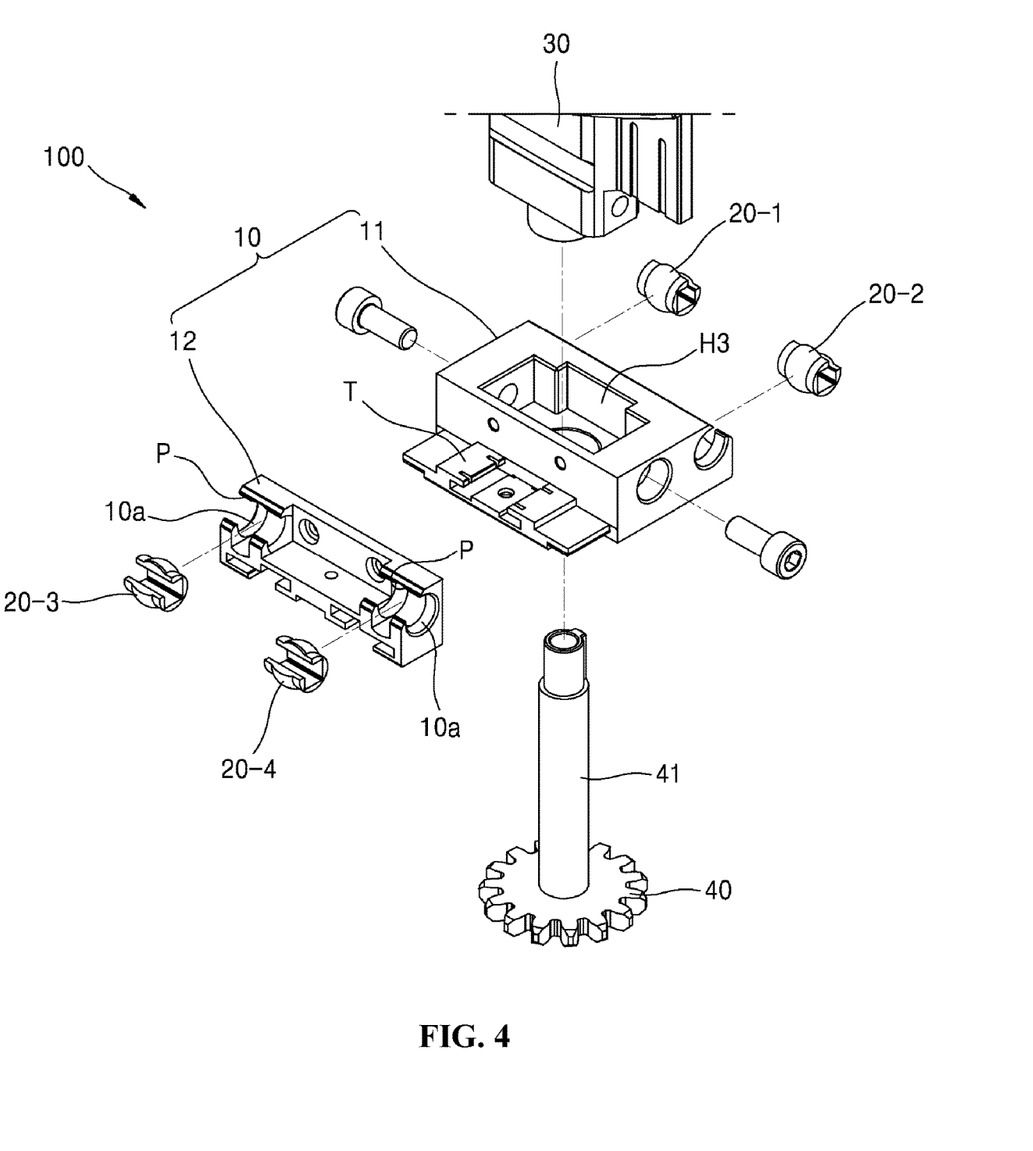
FIG. 4 is an exploded perspective view showing the components of the slide block assembly having a ball bushing bearing of FIG. 1.
Figure 5:
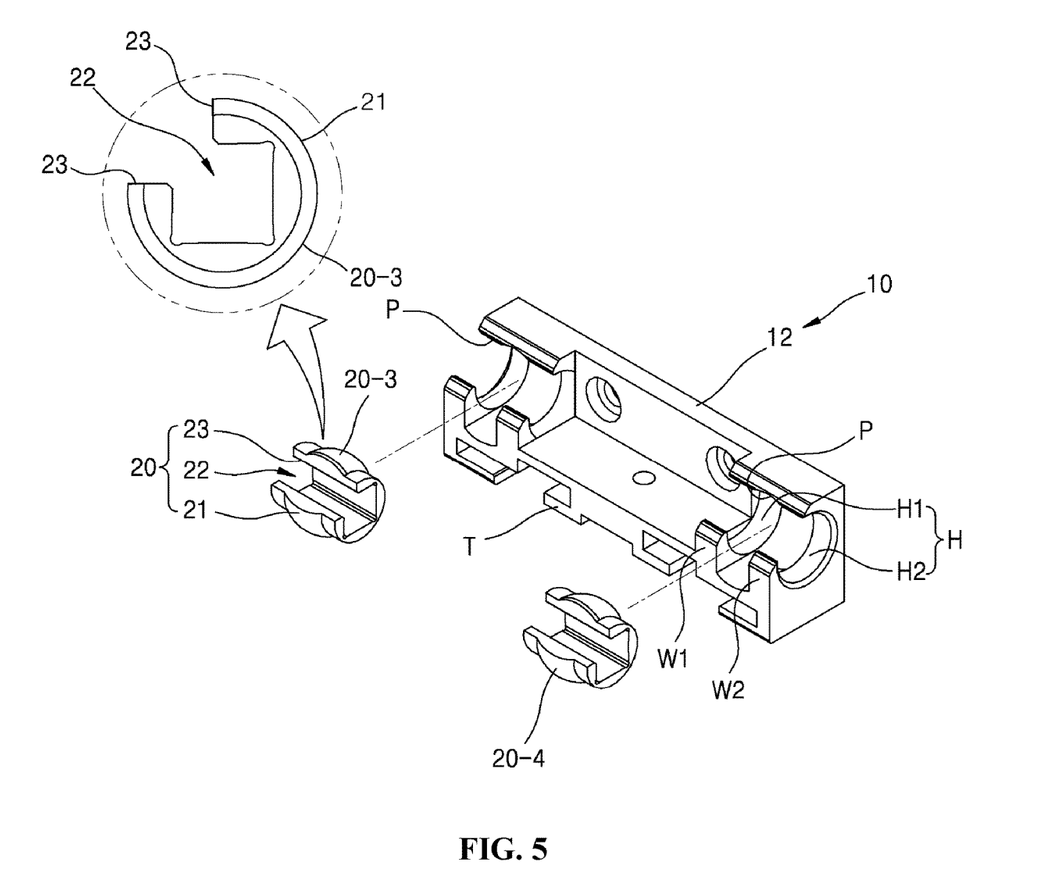
FIG. 5 is an enlarged perspective view of the slide block assembly having a ball bushing bearing of FIG. 4.

FIG. 3 is a front view of the slide block assembly 100 having the ball bushing bearing 20 of FIG. 1, FIG. 4 is an exploded perspective view showing the components of the slide block assembly 100 having the ball bushing bearing 20 of FIG. 1, and FIG. 5 is an enlarged perspective view of the slide block assembly 100 having the ball bushing bearing 20 of FIG. 4.

For example, as shown in FIGS. 3 to 5, the slide block 10 of the present invention may have a guide receiving part 10a formed at one side thereof to accommodate a slide guide G, which has a linear section D or a curved section R formed at least in part.

More specifically, as shown in FIGS. 4 and 5, the guide receiving part 10a of the slide block 10 may have a spherical groove part H formed on one side to correspond to the spherical surface of the ball bushing bearing 20, and may have a block opening part P on the other side in the shape of "C" to allow for a forced engagement with the ball bushing bearing 20 in order to enhance the assembly with the ball bushing bearing 20.

Therefore, an operator may forcibly expand the block opening P to insert the ball bushing bearing 20 into the guide receiving part 10a through the block opening part P for assembly. Once assembled, the ball bushing bearing 20 may freely perform articulated movements in the up, down, left and right directions, i.e., 360 degrees, when in sliding contact with the spherical groove part H, thus preventing play and jamming.

More specifically, for example, as shown in FIG. 5, the spherical groove part H of the guide receiving part 10a of the slide block 10 may include a first spherical groove part H1 formed on a first wall W1 formed in front of the guide receiving part 10a to reduce friction with the ball bushing bearing 20, and a second spherical groove part H2 spaced apart from the first spherical groove part H1 and formed on a second wall W2 formed at the rear of the guide receiving part 10a.

Thus, an empty space between the first wall W1 and the second wall W2 may be used as an elastic clearance space to elastically support the ball bushing bearing 20, and may allow foreign substances and friction heat inside to be easily discharged therethrough, leading to a significant improvement in product durability and reliability.

Additionally, as shown in FIG. 4, for example, the slide block 10 may be made in two pieces to enhance component productivity and component assembly.

In other words, the slide block 10 may include a first slide block 11 having a vertical through-hole H3 formed on one side thereof, a first ball bushing bearing 20-1 and a second ball bushing bearing 20-2 installed on the other side thereof, and a sliding rail part T formed on one lateral surface thereof; and a second slide block 12 having a third ball bushing bearing 20-3 and a fourth ball bushing bearing 20-4 installed on one side thereof and including a sliding rail part T that is fitted with the sliding rail part T of the first slide block 11.

Therefore, due to the complex shape of the slide block 10, it may be advantageous to assemble the first slide block 11 and the second slide block 12 together rather than forming the slide block 10 through a single injection. After the respective ball bushing bearings 20 are assembled to the respective blocks 11 and 12, the first slide block 11 and the second slide block 12 may be easily assembled using the sliding rail parts T, thus significantly improving the assembly of the ball bushing bearing 20. In particular, as shown by both arrows in FIG. 3, the second slide block 12 may perform lateral sliding movements with respect to the first slide block 11, ensuring smooth movement without jamming during operation.

Meanwhile, as shown in FIGS. 1 to 5, in some embodiments of the present invention, the ball bushing bearing 20 of the slide block assembly 100 having the ball bushing bearing 20 may have the inner surface formed in a shape corresponding to the sliding guide G so as to make sliding contact with the sliding guide G and the outer surface formed in a shape corresponding to the guide receiving part 10a so as to make rolling contact with the guide receiving part 10a by means of a ball method.

For example, as shown in FIGS. 1 to 5, the ball bushing bearing 20 may include a bearing body part 21 formed overall in a ball shape, a through-hole part 22 formed in the front and rear directions of the bearing body part 21 to allow the slide guide G to pass through its center, and a ball opening part 23 on one side in the shape of "C" to forcibly engage with the slide guide G to enhance assembly with the slide guide G.

Here, the bearing body part 21 may be made of an elastic plastic material that minimizes friction, allowing the ball opening part 23 to be forcibly expanded and engaged with the slide guide G while reducing vibrations and noise. Alternatively, a lubricating material obtained by impregnating or coating a lubricating ingredient on such plastic material is applicable. Additionally, the slide block 10 may also be made of an elastic plastic material. Of course, the use of other lubricants on other metals or ceramic materials is also possible.

In addition, for example, to further reduce friction, increase durability, and enhance resistance to impact, the slide guide G may be subjected to a soft anodizing surface treatment.

Therefore, by forcibly expanding the ball opening part 23, the operator may assemble the ball bushing bearing 20 through the ball opening part 23 onto the slide guide G that is welded and fixed onto one side of the lower rail of the vehicle, allowing the ball bushing bearing 20 to slide along the slide guide G.

More specifically, as shown in FIGS. 1 to 5, to prevent vertical and lateral play more robustly by increasing the contact areas in the vertical and lateral directions, the slide guide G may be generally in the shape of a rectangular bar, and the through-hole part 22 of the ball bushing bearing 20 may have a rectangular hole shape to correspond to the slide guide G.

Therefore, by utilizing the rectangular bar-shaped slide guide G with maximized the contact area of opposing contact surfaces and the rectangular hole-shaped through-hole part 22 of the ball bushing bearing 20, the seat cart 1 may can be more securely supported both in the vertical and horizontal directions.

In addition, as shown in FIGS. 1 to 5, the slide block assembly 100 having the ball bushing bearing 20 according to some embodiments of the present invention may further include a rotating body 30 that passes through the vertical through-hole H3 of the first slide block 11 and a pinion gear 40 that has a pinion drive shaft 41 rotatably installed inside the rotating body 30 and engages with a rack gear (not shown) installed on the lower rail of the vehicle, driving the seat cart 1 of the vehicle during rotation.

Figure 6:
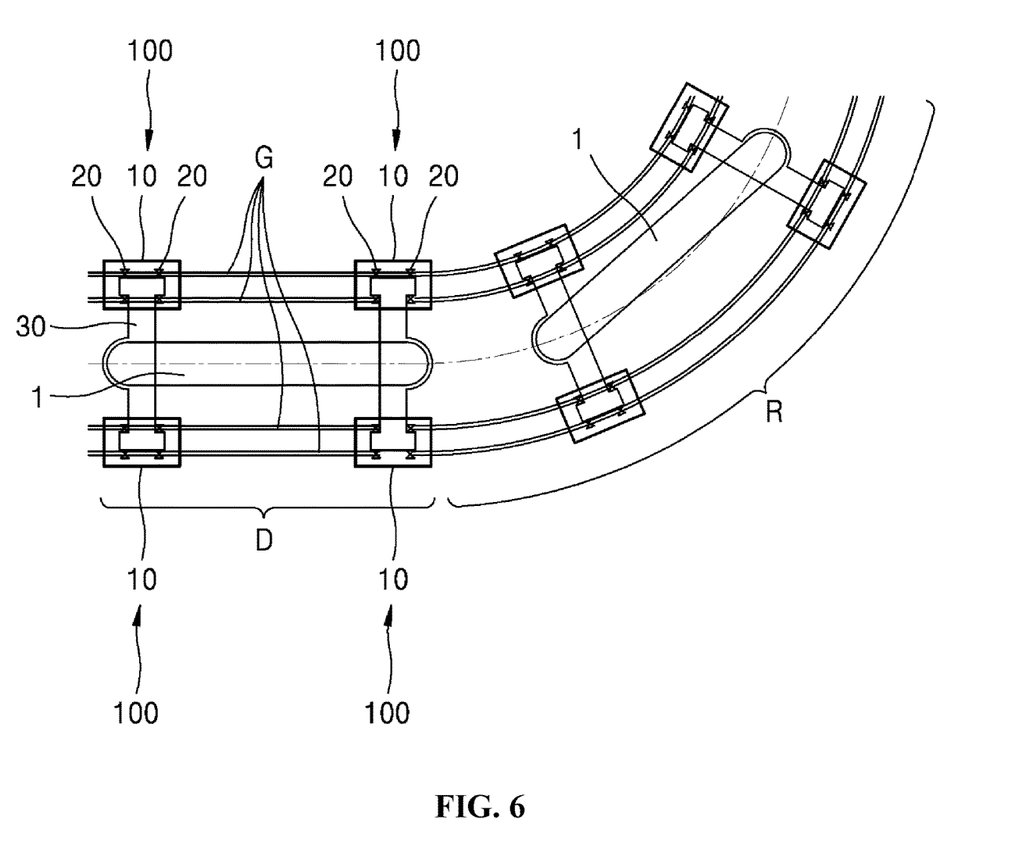
FIG. 6 is a plan view showing a state in which the slide block assembly having a ball bushing bearing of FIG. 1 travels along a linear section and a curved section.
Figure 7:
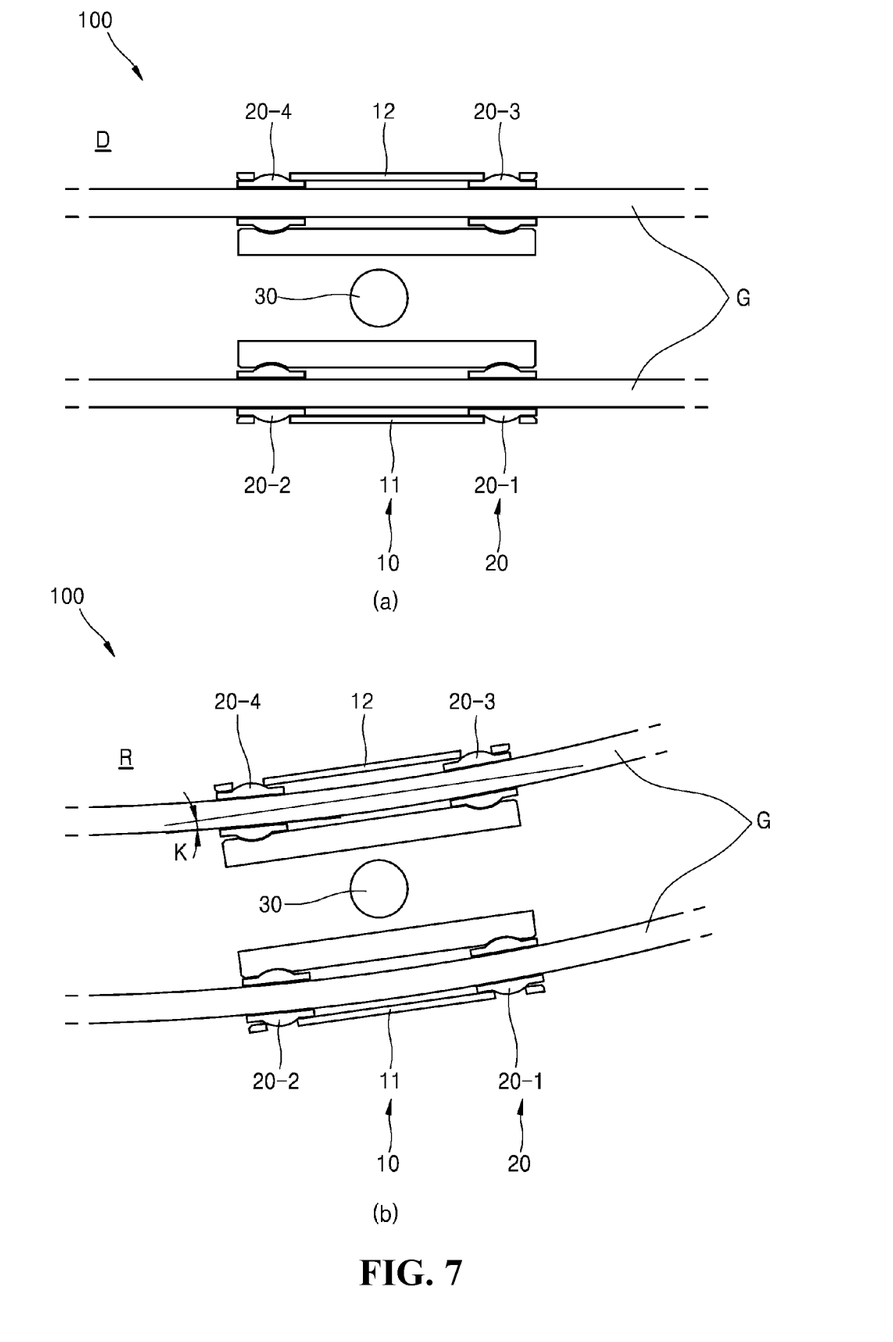
FIG. 7 is an enlarged plan cross-sectional view of a portion of the slide block assembly having a ball bushing bearing of FIG. 6.

FIG. 6 is a plan view showing a state in which the slide block assembly 100 having the ball bushing bearing 20 of FIG. 1 travels along a linear section and a curved section, and FIG. 7 is an enlarged plan cross-sectional view of a portion of the slide block assembly 100 having the ball bushing bearing 20 of FIG. 6.

As shown in FIGS. 1 to 7, at least four of the slide block assemblies 100 having the ball bushing bearing 20 according to some embodiments of the present invention may be installed on the front left, front right, rear left, and rear right sides of the seat cart 1 of the vehicle to support the vehicle's seat, an occupant, and external forces in the linear section D of the slide guide G as shown in (a) of FIG. 7, and even in the curved section R of the slide guide G as shown in (b) of FIG. 7. Due to the deviation in the left and right travel distances on the linear section D and curved section R of the slide guide G, the shape of the seat cart 1 may be distorted.

In this case, as shown in FIG. 7, since the ball bushing bearings 20 are bendable at various angles at their respective positions, it is possible to prevent any play or jamming between the slide guide G and the ball bushing bearings 20.

Preferably, through repeated experiments, it has been confirmed that it is advantageous for the articulation angle K of each of the ball bushing bearings 20 to be within approximately 1 to 5 degrees to minimize noise and vibrations. Furthermore, it has been found that an articulation angle of approximately 2.5 degrees is even more desirable, as it allows for smooth driving while minimizing noise and vibrations.

Figure 8:
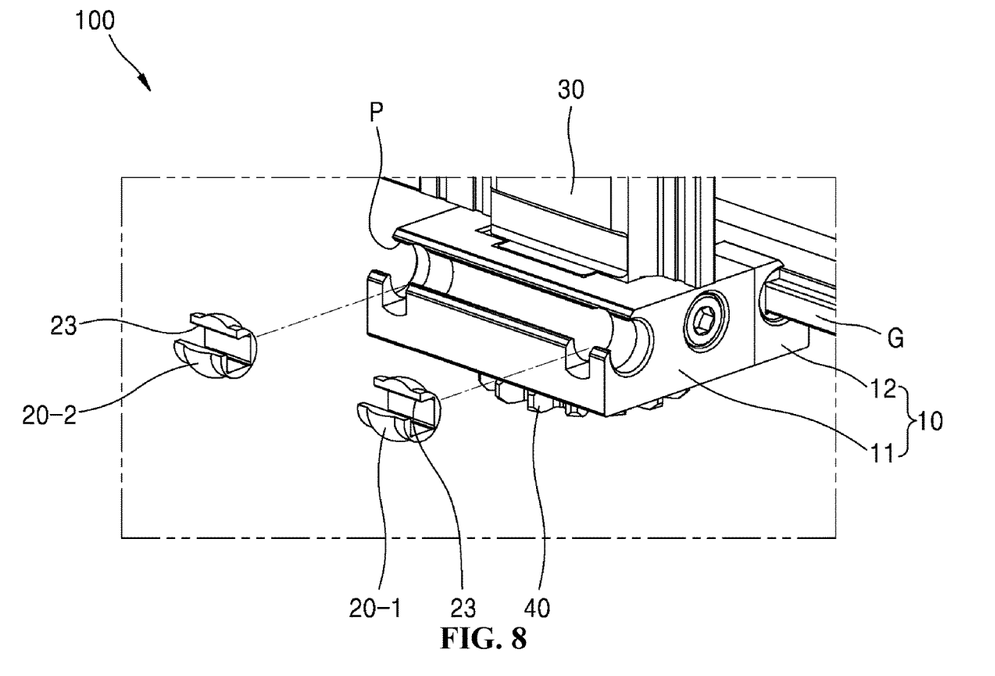
FIG. 8 is a perspective view of the slide block assembly having a ball bushing bearing of FIG. 1.

FIG. 8 is a perspective view of the slide block assembly 100 having the ball bushing bearing of FIG. 1.

As shown in FIG. 8, the installation positions of the first slide block 11 and the second slide block 12 of the slide block assembly 100 having a ball bushing bearing according to some embodiment of the present invention may be reversed.

Additionally, various forms and types of slide blocks 10 may be applied, such as the first slide block 11 and the second slide block 12 being integrated into one unity or installed separately on both sides of the rotating body 30.

Therefore, the shape, installation positions, and the number of the slide blocks 10 and ball bushing bearings 20 may be modified and changed within the scope of the technical concept of the present invention by those skilled in the art in the relevant field.

Thus, according to the present invention, it is possible to prevent play and jamming occurring between the seat cart 1 traveling along the linear section D or curved section R along the slide guide G and the slide guide G itself. This not only enables smooth driving but also prevents vibrations and noise by employing the ball bushing bearing 20 made of an elastic plastic material, as well as to provide robust support for the seat, an occupant, and external forces while significantly improving component assembly, tolerance management, and product durability.

Although the present invention has been described in connection with the exemplary embodiment shown in the drawings, it is only illustrative. It will be understood to those skilled in the art that various modifications and equivalents can be made without departing from the scope and spirit of the invention. Therefore, the scope of the present invention should be defined only by the appended claims.

The invention claimed is:

1. A slide block assembly having a ball bushing bearing, the slide block assembly comprising:
   a slide block which has formed at one side thereof a guide receiving part configured to receive a slide guide of which at least a portion is formed as a linear section or a curved section; and
   a ball bushing bearing having:
      an inner surface formed to correspond to the slide guide, and configured to make sliding contact with the slide guide, and
      an outer surface formed to correspond to the guide receiving part, and configured to contact the guide receiving part,
   wherein the slide block comprises:
      a first slide block having a first through-hole formed on one side thereof, a first ball bushing bearing and a second ball bushing bearing installed on the other side thereof, and a sliding rail part formed on one lateral surface thereof; and
      a second slide block having a third ball bushing bearing and a fourth ball bushing bearing installed on one side thereof and configured to be fitted with the sliding rail part of the first slide block.

2. The slide block assembly of claim 1, wherein the ball bushing bearing comprises:
   a bearing body part formed overall in a ball shape;
   a through-hole part formed in the front and rear directions of the bearing body part to allow the slide guide to pass through its center; and
   a ball opening part on one side to engage with the slide guide to enhance assembly with the slide guide.

3. The slide block assembly of claim 2, wherein the slide guide is generally in the shape of a rectangular bar to prevent vertical and lateral play by increasing contact areas in the vertical and lateral directions and the through-hole part of the ball bushing bearing has a rectangular hole shape to correspond to the slide guide.

4. The slide block assembly of claim 2, wherein the bearing body part is made of an elastic plastic material to allow the ball opening part to be forcibly expanded and engaged with the slide guide and reduces vibrations and noise.

5. The slide block assembly of claim 1, wherein the guide receiving part of the slide block has a spherical groove part formed on one side thereof to correspond to a spherical surface of the ball bushing bearing, and has a block opening part on the other side thereof; to allow for an engagement with the ball bushing bearing in order to enhance assembly with the ball bushing bearing.

6. The slide block assembly of claim 5, wherein the spherical groove part of the guide receiving part of the slide block comprises:
   a first spherical groove part formed on a first wall formed in front of the guide receiving part to reduce friction with the ball bushing bearing; and a second spherical groove part spaced apart from the first spherical groove part and formed on a second wall formed at the rear of the guide receiving part.

7. The slide block assembly of claim 1, further comprising:
   a rotating body that passes through the first through-hole of the first slide block; and
   a pinion gear that has a pinion drive shaft rotatably installed inside the rotating body and engages with a rack gear installed on a rail of a vehicle, driving a seat cart of the vehicle during rotation.

8. The slide block assembly of claim 1, further comprising a plurality of slide blocks,
   wherein the plurality of slide blocks include at least four slide blocks respectively installed on the front left, front right, rear left, and rear right sides of a seat cart of a vehicle, configured to support the vehicle's seat, an occupant, and external forces even in the curved section of the slide guide.

9. The slide block assembly of claim 1, wherein the slide guide is subjected to a soft anodizing surface treatment.

\* \* \* \* \*